United States Patent
O'Brien et al.

(10) Patent No.: US 9,950,863 B2
(45) Date of Patent: Apr. 24, 2018

(54) AUTOMATED ORDER FULFILLMENT SYSTEM AND METHOD

(71) Applicant: Dematic Corp., Grand Rapids, MI (US)

(72) Inventors: Mark D. O'Brien, Kentwood, MI (US); David M. Berghorn, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 135 days.

(21) Appl. No.: 15/052,080

(22) Filed: Feb. 24, 2016

(65) Prior Publication Data

US 2016/0244262 A1 Aug. 25, 2016

Related U.S. Application Data

(60) Provisional application No. 62/120,572, filed on Feb. 25, 2015.

(51) Int. Cl.

| | |
|---|---|
| *G06F 7/00* | (2006.01) |
| *B65G 1/137* | (2006.01) |
| *G06Q 30/06* | (2012.01) |
| *G06Q 10/08* | (2012.01) |
| *G05B 15/02* | (2006.01) |

(52) U.S. Cl.
CPC .......... *B65G 1/1373* (2013.01); *G05B 15/02* (2013.01); *G06Q 10/087* (2013.01); *G06Q 30/0635* (2013.01)

(58) Field of Classification Search
None
See application file for complete search history.

(56) References Cited

U.S. PATENT DOCUMENTS

| | | |
|---|---|---|
| 6,481,560 B2 | 11/2002 | Kearney |
| 6,826,444 B2 | 11/2004 | Herzog |

(Continued)

FOREIGN PATENT DOCUMENTS

WO 2014166650 A1 10/2014

OTHER PUBLICATIONS

International Search Report (Form PCT/ISA/210) and Written Opinion of the International Searching Authority (Form PCT/ISA/237) from corresponding Patent Cooperation Treaty Application No. PCT/US2016/019301, dated Apr. 29, 2016.

(Continued)

*Primary Examiner* — Yolanda R Cumbess
(74) *Attorney, Agent, or Firm* — Gardner, Linn, Burkhart & Ondersma, LLP

(57) ABSTRACT

An automated order fulfillment system and automated method for fulfilling orders includes a donor-handling system having at least two donor buffers and a recipient-handling system having at least one recipient buffer. An item-handling system includes a vision system and an item manipulator. The vision system has a field of view encompassing the at least two donor receptacle buffers. A control causes the vision system to scan items in a donor receptacle at one of the donor buffers to obtain a pick list of location data of items in the scanned donor receptacle. The control causes the manipulator to pick an item from a donor receptacle at the other of the donor buffers under guidance of the vision system and place the picked item to a recipient receptacle at the at least one recipient buffer using the location data of items in that donor receptacle.

25 Claims, 14 Drawing Sheets

(56) References Cited

U.S. PATENT DOCUMENTS

| | | |
|---|---|---|
| 8,015,778 B2 | 9/2011 | Tischhauser |
| 8,295,975 B2 | 10/2012 | Arimatsu et al. |
| 8,406,917 B2 | 3/2013 | Khan et al. |
| 8,480,347 B2 | 7/2013 | Schafer |
| 8,554,359 B2 | 10/2013 | Ichimaru |
| 8,812,147 B2 | 8/2014 | Keller et al. |
| 2007/0142961 A1 | 6/2007 | Bhasin et al. |
| 2012/0215350 A1 | 8/2012 | Murayama et al. |
| 2013/0110280 A1 | 5/2013 | Folk |
| 2013/0253697 A1* | 9/2013 | Issing .................. B65G 1/1376 700/214 |
| 2014/0031985 A1* | 1/2014 | Kumiya ................ B25J 9/1697 700/259 |
| 2014/0163737 A1 | 6/2014 | Nagata et al. |
| 2014/0244026 A1 | 8/2014 | Neiser |
| 2014/0350717 A1 | 11/2014 | Dagle et al. |
| 2014/0353117 A1* | 12/2014 | Gotou .................... G06Q 10/08 198/370.01 |
| 2014/0367962 A1 | 12/2014 | Girtman |
| 2014/0377049 A1 | 12/2014 | Girtman |
| 2015/0037131 A1 | 2/2015 | Girtman et al. |
| 2015/0057793 A1 | 2/2015 | Kawano |
| 2015/0120514 A1* | 4/2015 | Deshpande ...... G06Q 10/08355 705/28 |
| 2016/0075521 A1* | 3/2016 | Puchwein ............ B65G 1/1378 700/218 |
| 2016/0140488 A1* | 5/2016 | Lindbo ................ B65G 1/1373 705/28 |

OTHER PUBLICATIONS

Preliminary Report on Patentability of the International Searching Authority in English from corresponding Patent Cooperation Treaty (PCT) Application No. PCT/US2016/019301, completed Sep. 8, 2017.

* cited by examiner

AUTOMATED ORDER FULFILLMENT SYSTEM AND METHOD

CROSS REFERENCE TO RELATED APPLICATION

This application claims priority from U.S. patent application Ser. No. 62/120,572, filed on Feb. 5, 2015, the disclosure of which is hereby incorporated herein by reference.

BACKGROUND OF THE INVENTION

The present invention is directed to an order fulfillment system and method and, in particular, to a goods-to-robot picking system.

Order fulfillment of orders placed over the Internet must take place within a relatively short period of time in order to be commercially competitive. The same could be said for orders received by phone, facsimile or by the mail based on catalog or television-based merchandizing. Such order fulfillment is known as E-commerce and places demands on an order fulfillment system to meet such Obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a bar code or radio frequency identification (RFID) tag that identifies the SKU of the item. Order fulfillment has utilized a goods-to-person system in which a computer system retrieves donor receptacles, also known as inventory receptacles or product receptacles, from an inventory buffer, such as an automated warehouse. The donor receptacles are delivered to a goods-to-person station. The computer system instructs the operator to remove one or more items from a donor receptacle and deposit the item(s) to one or more recipient receptacles, also known as order receptacles, customer receptacles, or the like.

Goods-to-robot order fulfillment systems have to be proposed in order to replace the human operator. However, such systems have not been satisfactory.

SUMMARY OF THE INVENTION

The present invention is directed to an enhanced goods-to-robot order fulfillment system and method that overcomes the difficulties of prior techniques. In particular, the present system and method provides order fulfillment efficiently and effectively.

An automated order fulfillment system and automated method for fulfilling orders, according to an aspect of the invention, includes a donor-handling system having at least two donor buffers and a recipient-handling system having at least one recipient buffer. An item-handling system includes a vision system and an item manipulator. The vision system has a field of view f encompassing the at least two donor receptacle buffers. A control causes the vision system to scan items in a donor receptacle at one of the donor buffers to obtain a pick list of location data of items in the scanned donor receptacle. The control causes the manipulator to pick an item from a donor receptacle at the other of the donor buffers under guidance of the vision system and place the picked item to a recipient receptacle at the at least one recipient buffer using the location data of items in that donor receptacle.

An automated order fulfillment system and automated method for fulfilling orders, according to an aspect of the invention, includes a donor-handling system having at least two donor buffers and a recipient-handling system having at least one recipient buffer. An item-handling system includes a vision system and an item manipulator. The vision system has a field of view f encompassing the at least two donor receptacle buffers. A control causes the vision system to scan items in a donor receptacle at one of the donor buffers to obtain a pick list of location data of items in the scanned donor receptacle. The control causes the manipulator to pick an item from a donor receptacle at the other of the donor buffers under guidance of the vision system and place the picked item to a recipient receptacle at the at least one recipient buffer using the location data of items in that donor receptacle. The control causes the vision system to scan items in a receptacle at one of said donor buffers overlapping in time with the manipulator picking items from another receptacle at another of the donor buffers under guidance of the vision system.

An automated order fulfillment system and automated method for fulfilling orders, according to an aspect of the invention, includes a donor-handling system having at least two donor buffers and a recipient-handling system having at least one recipient buffer. An item-handling system includes a vision system and an item manipulator. The vision system has a field of view f encompassing the at least two donor receptacle buffers. A control causes the vision system to scan items in a donor receptacle at one of said donor buffers to obtain a pick list of location data of items in the scanned donor receptacle. The control causes the manipulator to pick an item from a donor receptacle at the other of the donor buffers under guidance of the vision system and place the picked item to a recipient receptacle at the at least one recipient buffer using the location data of items in that donor receptacle. The control causes the vision system to scan items of the another donor receptacle at the another donor buffers from which the manipulator is picking items to provide a new pick list if there are items remaining in the donor receptacle after the original pick list is fully picked.

The donor receptacle handling system may include at least two donor conveying lines, each having one of the donor buffers. The vision system may have a field of view f encompassing portions of the at least two donor conveying lines. The vision system scans items in a donor receptacle at the donor buffer of one of said donor conveying lines while the manipulator picks an item from a donor receptacle at the donor buffer of the other of the donor conveying lines under guidance of the vision system.

The pick list may include height of items that are visible to the vision system and the manipulator picks items from the pick list in sequence according to height of the items. The vision system may create a new pick list if there are items remaining in a donor receptacle when the first pick list is completely picked. The vision system may include one or more three-dimensional image capture devices.

The vision system may scan items of the another donor receptacle at the another donor buffer from which the manipulator is picking items to provide a new pick list if there are items remaining in the donor receptacle after the original pick list is fully picked.

The recipient buffer may be at a different elevation than the donor buffers. The recipient buffer may be subjacent the donor buffers. The donor buffers may be at different elevations and the recipient buffer may be at an intermediate elevation between the elevations of the donor buffers. The item manipulator may be a robot arm with an end-of-arm item-grasping tool. The item manipulator may be straddled by the donor buffers. The item manipulator may be straddled by the recipient-handling system.

The at least one recipient buffer may be a plurality of generally parallel recipient buffers each connected with a non-completed recipient receptacle conveying line at one end thereof and a completed recipient receptacle conveying line at an opposite end thereof.

These and other objects, advantages and features of this invention will become apparent upon review of the following specification in conjunction with the drawings.

DESCRIPTION OF THE PREFERRED EMBODIMENT

Figure 1:
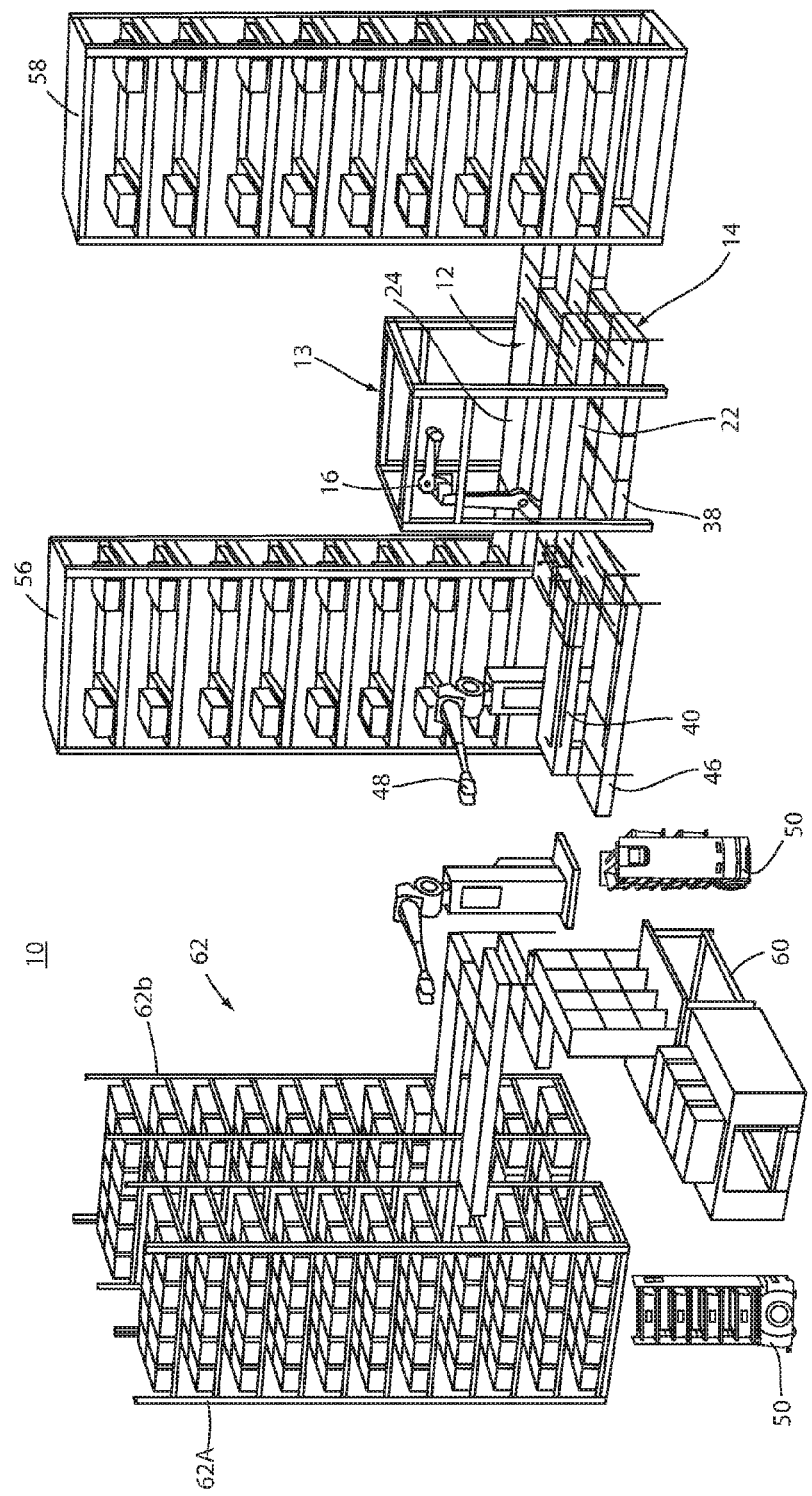
FIG. 1 is a perspective view of an automated order fulfillment system, according to an embodiment of the invention, taken from the front right side thereof.
Figure 2:
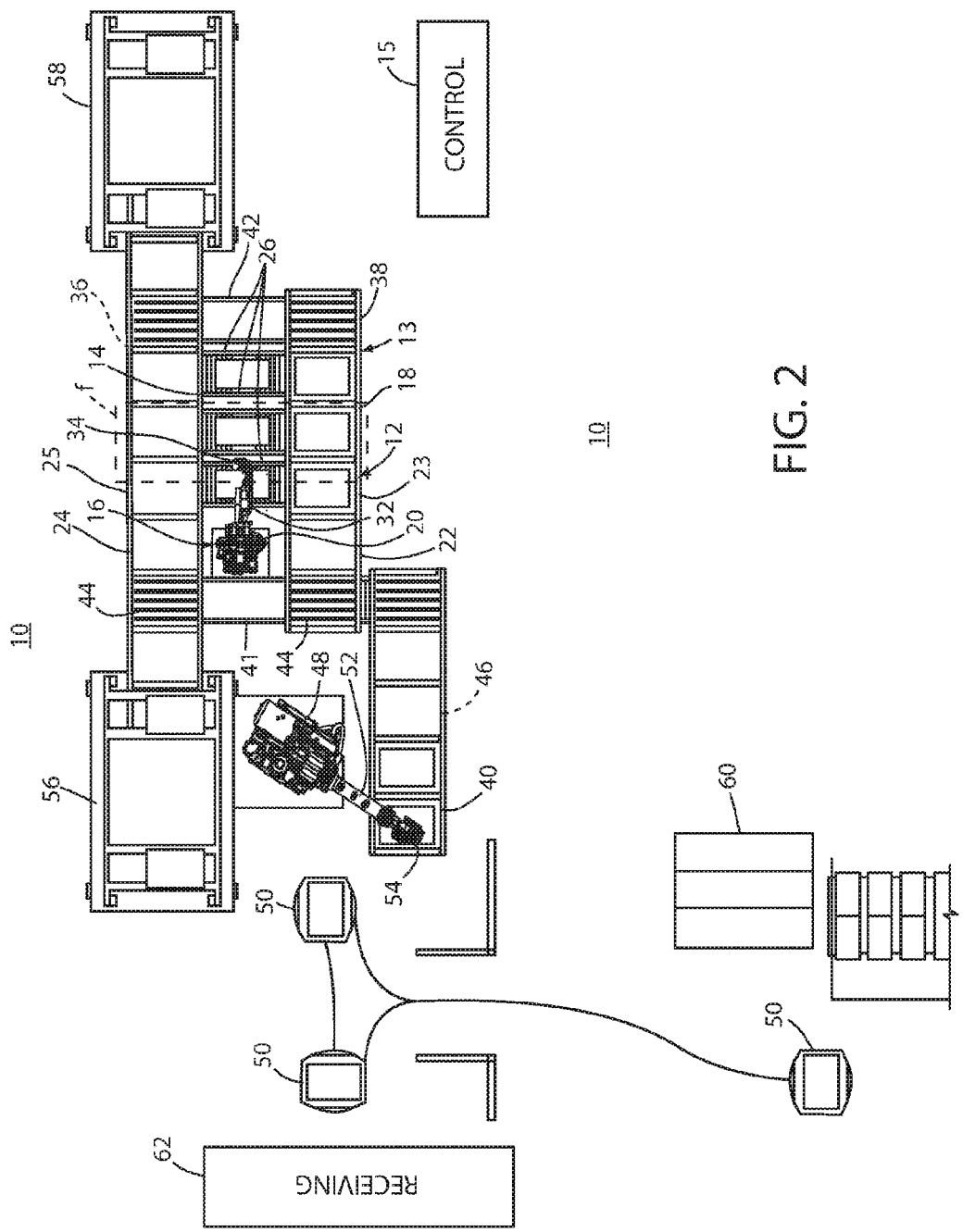
FIG. 2 is a perspective view of the automated order fulfillment system in FIG. 1 taken from the rear left side thereof.
Figure 3:
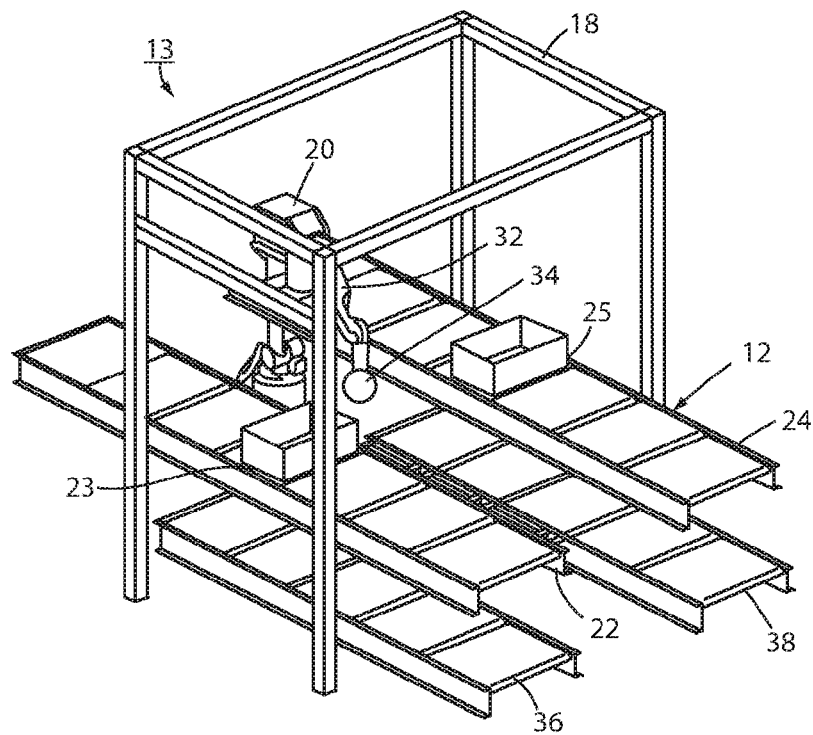
FIG. 3 is a perspective view of the picking system shown in FIGS. 1 and 2.
Figure 4:
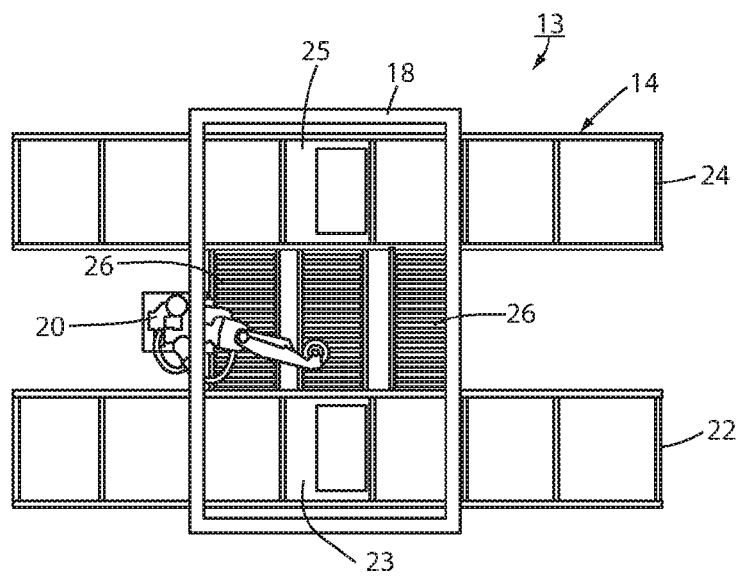
FIG. 4 is a top plan view of the picking system in FIG. 3.

Referring now to the drawings and the illustrative embodiments depicted therein, an automated order fulfillment system 10 includes a picking system 13 having a donor-handling system 12 that is adapted to handling donor receptacles (not shown) having items that are needed to fill customer orders, a recipient-handling system 14 that is adapted to handling recipient receptacles to receive items from at least one donor receptacle and an item-handling system 16 for transferring items from donor receptacles to recipient receptacles. Each donor receptacle may have a unique identification, known as a "license plate", which may be a bar code, or RFID tag, or other machine readable indicia. Each donor receptacle may hold a number of identical items or a heterogeneous collection of different types of items. Each donor receptacle may be a tote, tray, box or other type of container and may be internally divided into compartments that may vary in size from one receptacle to the next.

Item-handling system 16 includes a vision system 18 and an item manipulator 20. Vision system 18 has a field of view f of encompassing at least two donor receptacles at donor-handling system 12. Vision system 18 is a three-dimensional (3D) image camera system that is adapted to scanning items in a donor receptacle in three dimensions in order to obtain location data of items in the scanned donor receptacle to develop a "pick list" of items in that receptacle that are within view of vision system 18. While vision system 18 could be carried out with one three-dimensional camera, two such cameras provide finer resolution. Manipulator 20 is adapted to picking an item from a donor receptacle and placing the picked item to a recipient receptacle at the recipient-handling system using the location data of items from the pick list in that donor receptacle. A control for order fulfillment system 10 causes vision system 18 to scan items in one donor receptacle overlapping in time with manipulator 20 picking items from another donor receptacle. An advantage of such control technique is that it significantly increases the throughput of the system by allowing two functions to be carried out in parallel rather than in series.

It should be understood that item-handling system 16 may be used to transfer inventory items from donor receptacles at donor-handling system 12 to recipient receptacles at recipient-handling system 14 in order to collect one or more partial or complete customer orders in recipient receptacles. Such "dirty tote" recipient receptacles are then transferred to a put function, such as a put wall shown schematically at 60, to separate the collection of customer orders to individual customer orders. Item-handling system 16 could also be used to put items from a "dirty tote" of combined customer orders in a donor receptacle to a recipient receptacle in order to separate collections of customer orders to individual orders in a recipient receptacle. Other functions will be apparent to the skilled artisan.

Figure 5:
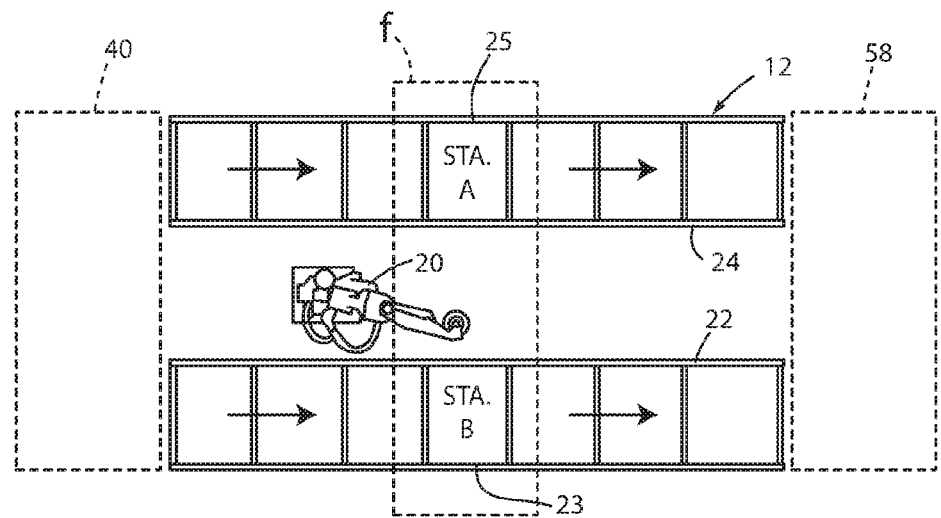
FIG. 5 is a top plan view of the donor-handling system in FIGS. 3 and 4.
Figure 6:
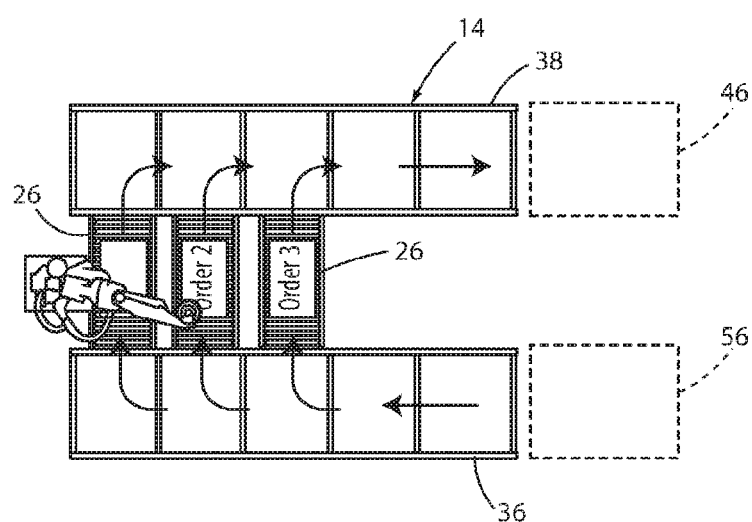
FIG. 6 is a top plan view of the recipient-handling system in FIGS. 3 and 4.

Donor receptacle handling system 12 includes two (shown) or more donor conveying lines 22, 24 one having a donor buffer 23 and the other a donor buffer 25. Vision system field of view f encompasses buffers 23, 25 of the two or more donor conveying lines 22, 24, shown as station A and station B in FIGS. 5 and 8. In this manner, vision system 18 scans items in a donor receptacle at station A defined by buffer 23 of one of donor conveying lines 22 while vision system 18 guides manipulator 20 picking an item from a donor receptacle at station B defined by buffer 25 of the other of donor conveying lines 24 and vice versa. Recipient-handling system 14 includes at least one recipient buffer 26 (three are shown in FIGS. 1-4 and six are shown in FIGS. 5 and 6) that traverses donor conveying lines 22, 24 and at least temporarily hold a recipient receptacle. This is accomplished by recipient buffers 26 being at a different elevation than buffers 23, 25 of respective donor conveying lines 22, 24. In the illustrated embodiments, recipient buffers 26 are subjacent, or below, donor buffers 23, 25 of conveying lines 22, 24, but could, alternatively, be superjacent the donor conveying line buffers.

Item manipulator 20 is shown as a robot arm 32 with an end-of-arm item-grasping tool 34. In the illustrated embodiment, the end-of arm tool is suction-actuated to be able to pick up individual items, but could be any form of mechanical gripper or other engaging device. Vision system 18 is shown as a three-dimensional camera, and items are scanned in a donor receptacle in order to create a three-dimensional image of items in the donor receptacle to provide coordinate data of pick-able objects in the receptacle to populate the pick list. In the illustrated embodiment, item manipulator 20 is a Fanuc M20ia robot arm and vision system 18 is a Fanuc 3D area sensor system.

Recipient buffers 26 are a plurality of generally parallel product conveying lines each connected with a non-completed recipient receptacle conveying line 36 at one end thereof and a completed recipient receptacle conveying line 38 at an opposite end thereof. Donor conveying lines 22, 24 are interconnected at an upstream end thereof to a donor receptacle source 40 of at least partially full donor receptacles using a first interconnect conveying line 41 and at an opposite end thereof to a destination 58 of at least partially empty donor receptacles, such as using a second interconnect conveying line 42. Donor receptacle source 40 may, in turn, be connected via interconnect conveying line 41 with an automated warehouse 56 of the type marketed by Dematic Corp under the Dematic Multishuttle brand. Warehouse 56 is to buffer donor receptacles and is another source of donor receptacles for supply to donor-handling system 12. A plurality of transfer switches 44 are provided, one between first interconnect conveying line 41 and each donor conveying line 22, 24 to selectively transfer donor receptacles to that donor conveying line. Destination 58 may also an automated warehouse similar to automated warehouse 56 and may be used to buffer empty donor receptacles for use as recipient receptacles. Item manipulator 20 is straddled by donor conveying lines 22, 24. Manipulator 20 is also straddled by interconnect conveying lines 41, 42.

Completed recipient receptacle conveying line 38 is illustrated as connected with a completed recipient receptacle destination 46. Completed recipient receptacle destination 46 may be adjacent donor receptacle source 40 and may be immediately above or below donor receptacle source 40. In the illustrated embodiment, a receptacle manipulator 48 is adapted to transfer at least partially full donor receptacles from a transport vehicle 50 to donor receptacle source 40 and to transfer at least partially completed recipient receptacles from recipient receptacle destination 46 to transport vehicle 50. In the illustrated embodiment, transport vehicle 50 is a robotic vehicle that has receptacle storage locations thereon as disclosed in commonly assigned International Publication No. WO/2015/035300 A8 for AUTONOMOUS MOBILE PICKING, the disclosure of which is hereby incorporated herein by reference. Receptacle manipulator 48 is another robot arm with an end-of-arm receptacle grasping tool of the type known in the art. In the illustrated embodiment, receptacle manipulator 48 is a Fanuc R2000i robot equipped with a vision system to locate receptacles as well as storage locations on transport vehicle. Transport vehicle 50 receives donor receptacles from a receiving function shown schematically as automated warehouses 62a, 62b, or the like, but may be any source of inventory items and discharges recipient receptacles to donor source 40. Of course other type of conveying system can be used, such as a fixed conveyor or the like. Completed receptacle destination 46 may be supplied, such as via a transport vehicle 50 or other conveying system to a manual put wall 60 of the type known in the art for separation of partial orders to customer order locations on the put wall. Alternatively, another order fulfillment system 10 may receive the recipient receptacles from transport vehicle 50 and process the recipient receptacles to individual customer orders as discussed above.

A more detailed view of donor-handling system 12 is shown in FIG. 5 and recipient-handling system 14 in FIG. 6. As can be seen in FIG. 5, the flow of receptacles on both donor conveying lines 22 and 24 are together from left to right although could be run counter-flow with interconnecting conveyor lines 41 and 42 shown in FIGS. 1 and 2, but not in FIG. 5. As can be seen in FIG. 6, non-completed recipient conveyor line 36 runs counter-flow to completed recipient conveyor line 38 with recipient buffers 26 spanning lines 36 and 38. Recipient receptacles temporarily reside at a recipient buffer 26 while item manipulator 20 removes items from a donor receptacle on a donor conveying line 22, 24 and places the item in a recipient receptacle on one of the recipient buffer 26. Thus, recipient receptacles originate from receptacle supply 56 and travel over recipient buffer 26 and are received by completed receptacle destination or sent to final sortation at competed receptacle destination 46.

Figure 7:
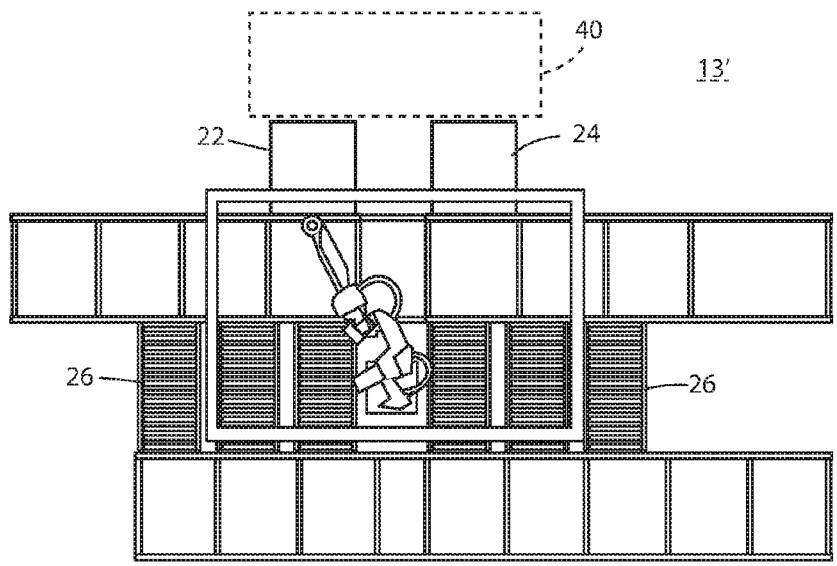
FIG. 7 is a top plan view of an alternative embodiment of a picking system.
Figure 8:
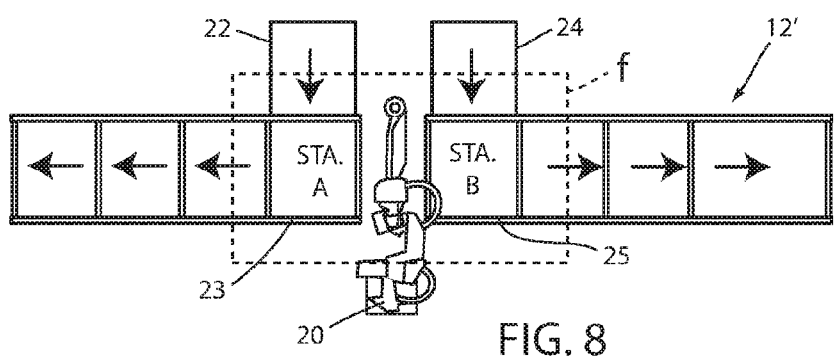
FIG. 8 is a top plan view of the donor-handling system in FIG. 7.
Figure 9:
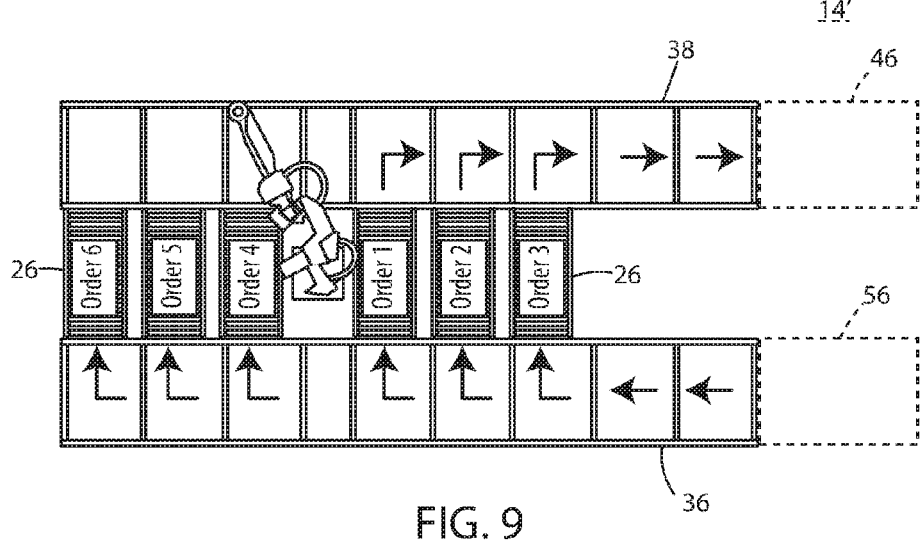
FIG. 9 is a top plan view of the recipient-handling system in FIG. 7.

An alternative arrangement of order fulfillment system 10' is shown in FIGS. 7-9 with a donor-handling system 12' in FIG. 8 and recipient-handling system 14' shown at 14' in FIG. 9. In order fulfillment system 10' donor conveying lines 22 and 24 start from donor source 40 in parallel but diverge at stations A and B. Lines 22 and 24 convey donor receptacles in opposite directions to respective donor receptacle destinations 58. Recipient-handling system 14' includes six (6) recipient buffers 26 which are on opposite sides of item manipulator 20. With completed recipient conveying line 38 subjacent to portions of donor conveying lines 22 and 24, item manipulator 20 can easily reach donor receptacles at stations A and B and recipient receptacles at recipient buffers 26.

Figure 10:
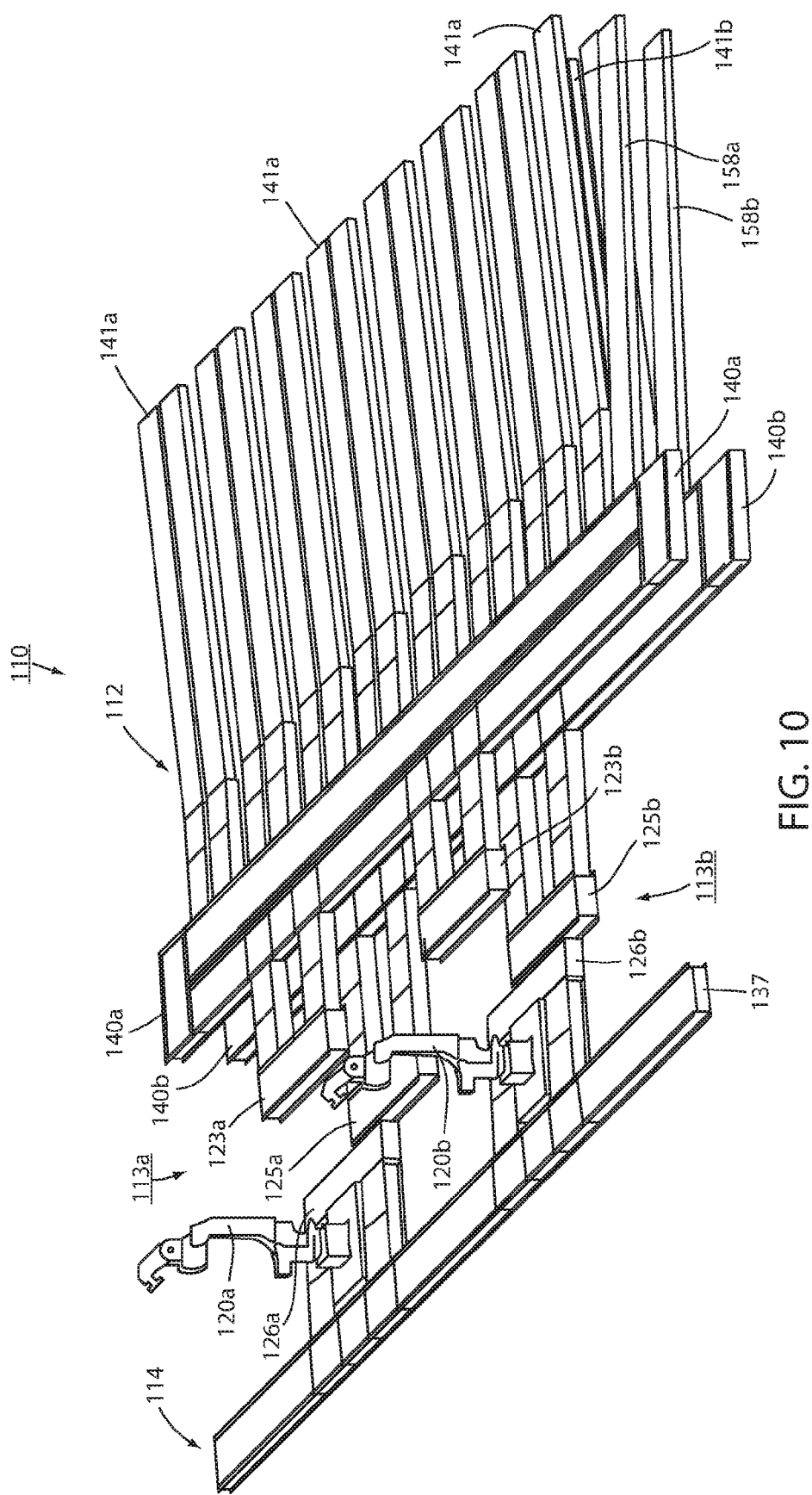
FIG. 10 is a perspective view of an order fulfillment system, according to an alternative embodiment of the invention.
Figure 11:
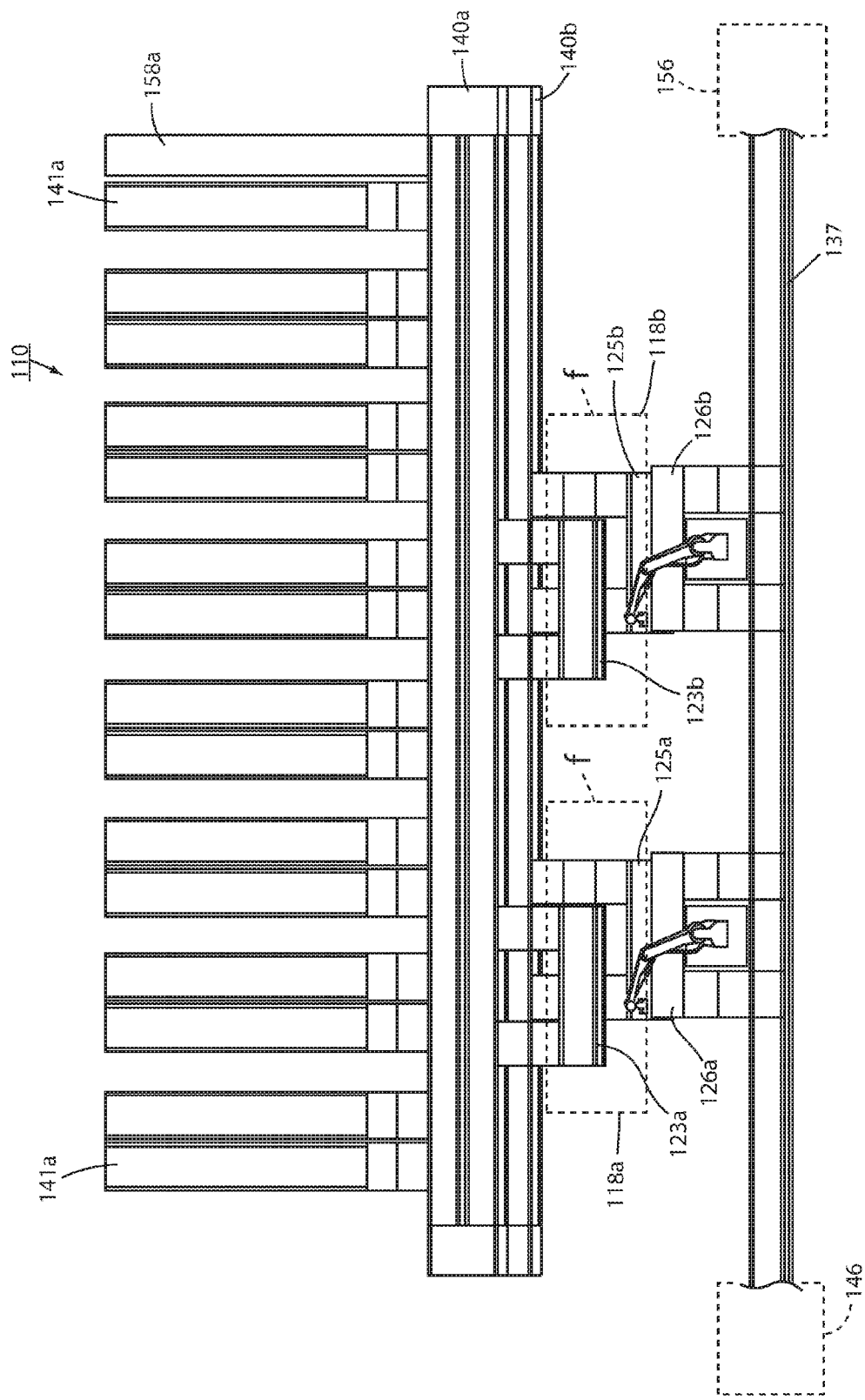
FIG. 11 is a top plan view of the order fulfillment system in FIG. 10.
Figure 12:
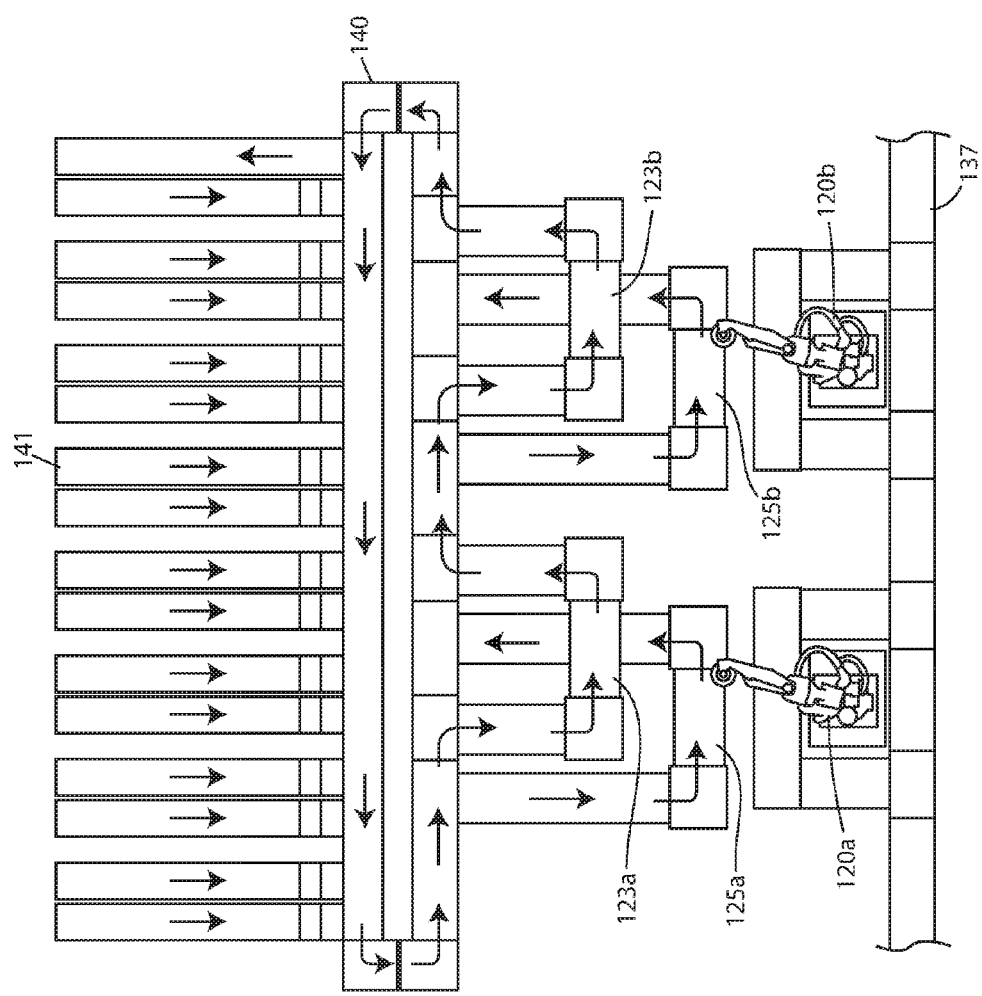
FIG. 12 is the same view as FIG. 11 showing receptacle flow in the donor-handling system.
Figure 13:
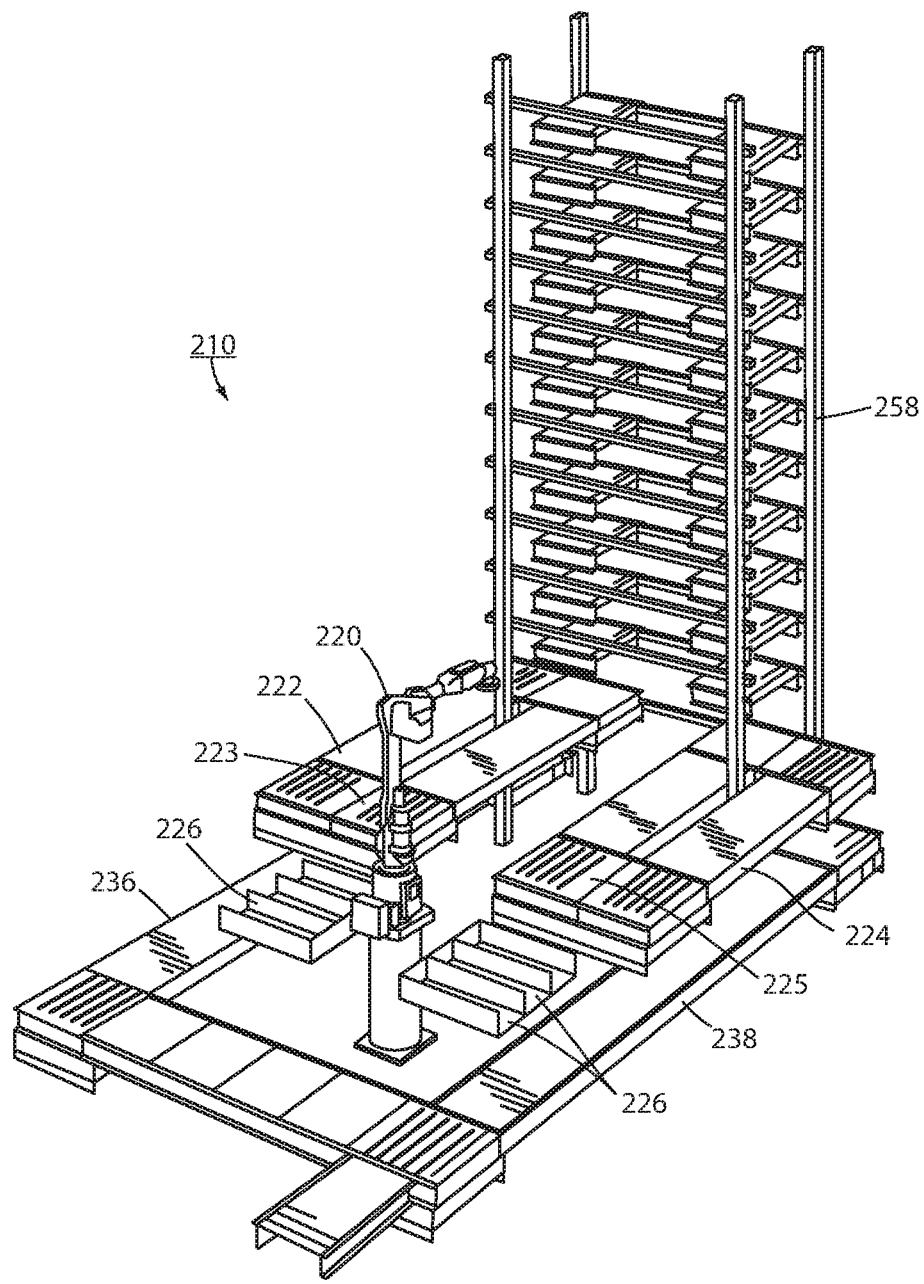
FIG. 13 is a perspective view of an order fulfillment system, according to another alternative embodiment of the invention.
Figure 14:
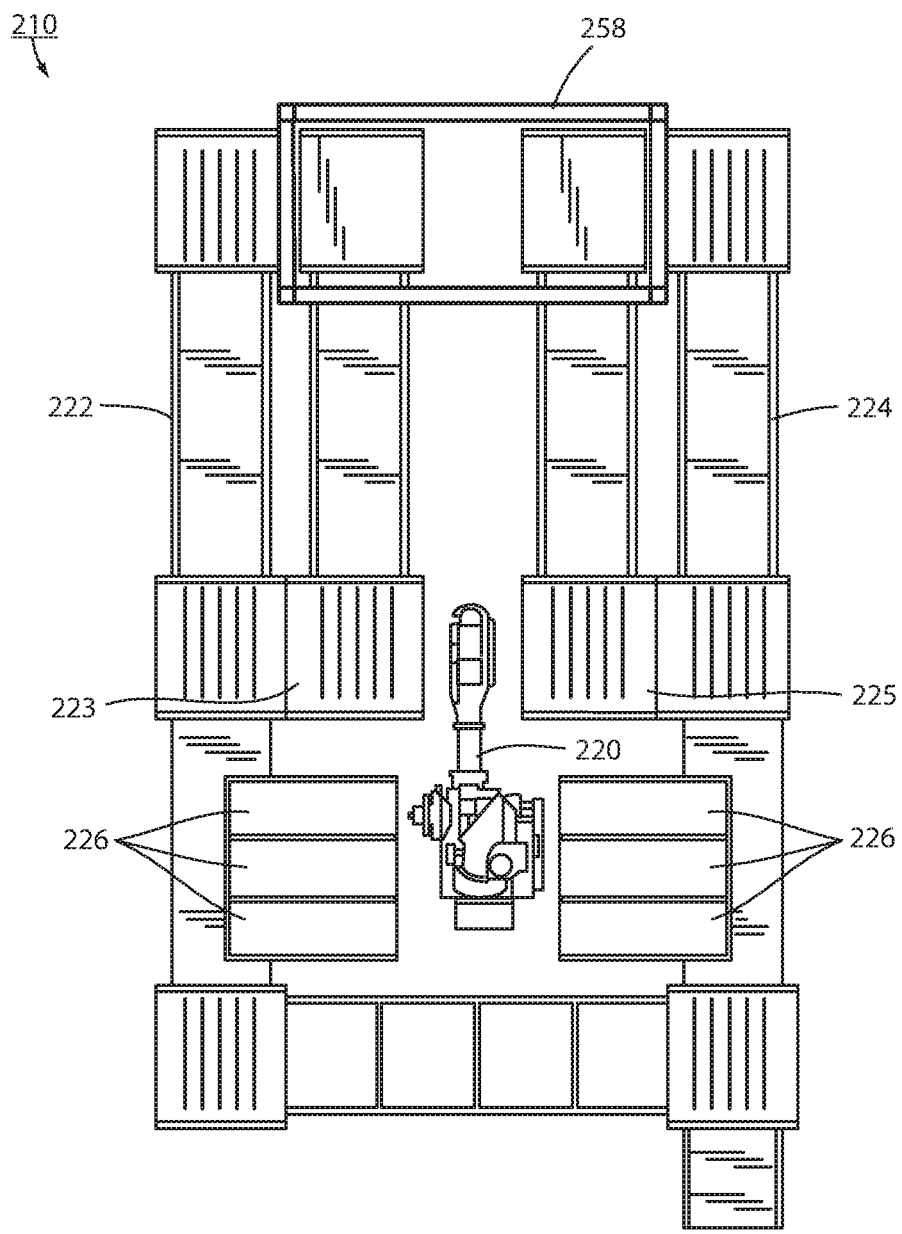
FIG. 14 is a top plan view of the order fulfillment system in FIG. 13.
Figure 15:
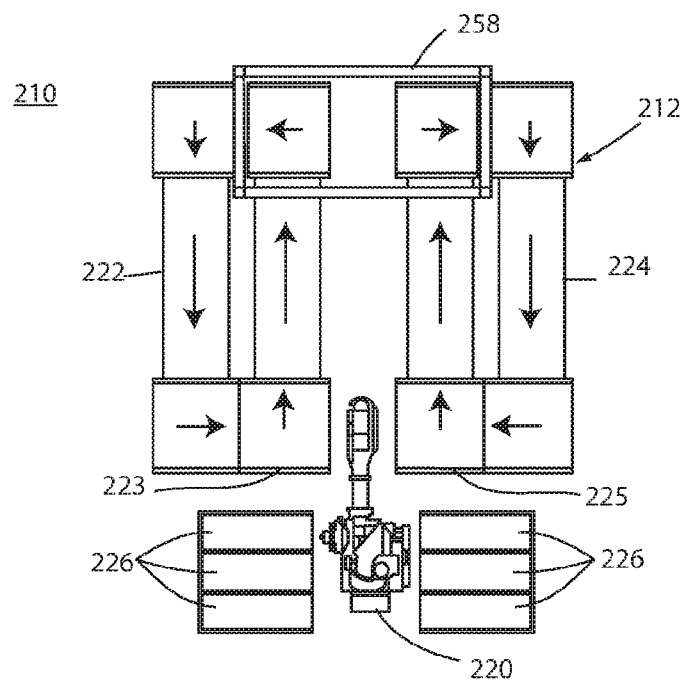
FIG. 15 is a top plan view of the donor-handling system and a portion of the recipient-handling system in FIGS. 13 and 14.
Figure 16:
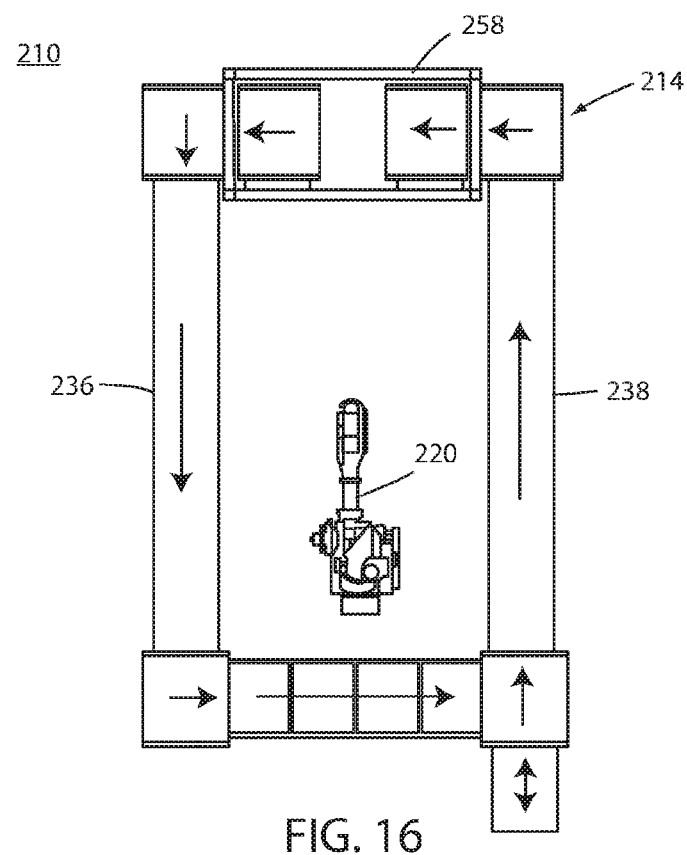
FIG. 16 is a top plan view of the rest of the recipient-handling system in FIGS. 13 and 14.

An order fulfillment system 110 is illustrated in FIGS. 10-12 with two picking systems 113a, 113b made up of two vision systems shown schematically at 118a and 118b, two donor-handling systems, two recipient-handling systems and two item manipulators 120a and 120b. The donor-handling system has at least a first donor conveying line 122a and a second conveying line 124a that is generally subjacent first donor conveying line 122a. Vision system 118a is a 3D image capture system having a field of view f that encompasses a first donor buffer 123a and second donor buffer 125a.

Vision system 118b is a 3D image capture system having a field of view f that encompasses first donor buffer 123b and second donor buffer 125b.

Recipient-handling system 114 has a recipient buffer 126a that is adjacent donor buffer 123a and 125a and vertically spaced between the donor buffers. The recipient-handling system has recipient buffers 126b that are adjacent the respective donor buffers 123b and 125b. In this manner, vision system 118a is adapted to scanning a receptacle at the donor buffers 123a while item manipulator 120a is picking items from a receptacle at the donor buffer 125a under the guidance of information provided by vision system 118a and vice versa. Vision system 118b is adapted to scanning a receptacle at the donor buffer 123b while item manipulator 120b is picking items from a receptacle at the donor buffer 125b under the guidance of information provided by vision system 118b and vice versa.

More specifically, order fulfillment system 110 includes a donor source made up of a plurality of conveying lines 141a and subjacent conveying lines 141b each of which is a gravity conveying line but could alternatively be powered. Receptacles are fed from conveying lines 141a, 141b to circulating donor source lines 140a, 140b where donor receptacles are circulated until one is needed by first picking system 113a or second picking system 113b. First picking system 113a is made up of a first donor conveying line having first donor buffer 123a and a second donor conveying line having second donor buffer 125a. The needed donor receptacle is transferred by a right angle transfer to that donor conveying line. Once a donor receptacle is depleted either fully or partially it is returned to the respective donor source line 140a, 140b where it may be recirculated until needed subsequently or may be diverted to a donor destination 158a, 158b which may also be a gravity conveying line, or the like.

In a similar fashion, second picking system 113b includes a first donor conveying line having a first donor buffer 123b and a second donor conveying line having a second donor buffer 125b. Circulating donor source line 140a feeds donor receptacles to a first donor conveying line having first donor buffer 123b using a right angle transfer. Circulating donor source line 140b feeds donor receptacles to a second donor conveying fine having a second donor buffer 125b. Fully or partially depleted donor receptacles are returned to circulating donor source line 140b and then to donor destination 158b.

First and second picking systems 113a, 113b include a joint recipient-handling system 114 that includes a combination recipient receptacle supply and completed line 137 from a recipient supply source 156 to a competed receptacle destination 146. As an empty or partially full receptacle is needed, it is diverted from line 137 to a recipient buffer 126 then returned to line 137 when processed. First picking system 113a includes first item manipulator 120a and a first recipient buffer 126a that runs generally parallel to the first and second donor buffers 123a, 125a but at a different vertical level than the donor conveying line buffers. Second picking system 113b includes second item manipulator 120b and a second recipient buffer 126b that runs generally parallel to the first and second donor buffers 123b, 125b but at a different vertical level that the donor conveying line buffers. In particular, each recipient buffer 126a, 126b is verticality below the respective first donor buffer 123a, 123b and vertically above the respective second donor buffer 125a, 125b. Also, although one recipient buffer 126a, 126b is shown for each picking system it should be understood that a series of buffers may be used, each holding a separate recipient receptacle. Recipient handling system 114 surrounds manipulators 126a, 126b.

An order fulfillment system 210 shown in FIGS. 13-16 includes a donor-handling system 212, a recipient-handling system 214 and an item manipulator 220. Donor-handling system 212 includes a first donor conveying line 222 and a second donor conveying line 224. First donor conveying line 222 recirculates donor receptacles between a donor designation 258, which may be an automated warehouse, or the like, and a first donor buffer 223 that defines a pick station A from which an item manipulator 220 picks items. Second donor conveying line 224 recirculates donor receptacles between donor destination 258 and a second donor buffer 225 that defines a pick station B from which item manipulator 220 picks items. A vision system, not shown, is a 3D imaging system with a field of view that encompasses donor buffers 223 and 225 so that items are scanned in a receptacle at one of the buffers while items are picked from the other buffer using vision system 218.

Recipient-handling system 214 includes a non-completed recipient receptacle line 236 that supplies empty or partially empty recipient receptacles past recipient buffers in the form of trays 226 and a completed recipient conveyor line 238 that returns full or partially full recipient receptacles to destination 258. As receptacles on recipient lines 236 and 238 pass by recipient buffer trays 226, the items in the buffer trays are transferred to the passing receptacles. Thus, item manipulator 220 picks items from a donor receptacle at one of buffers 223, 225 and puts the items on a buffer tray 226 where they are collected until deposited to a recipient receptacle on a recipient conveyor line 236, 238.

Figure 17A:
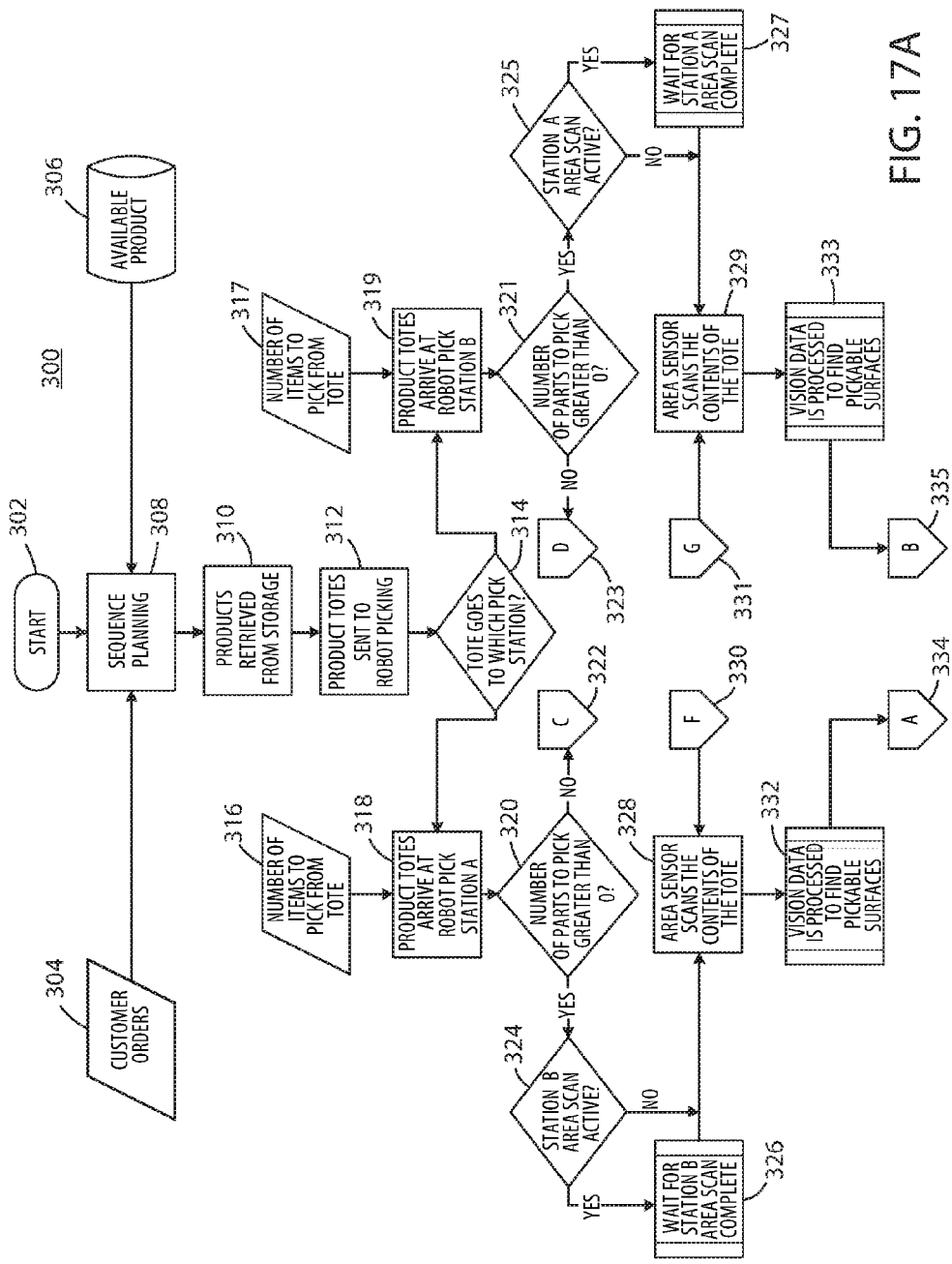
FIGS. 17a-17c are a flowchart of a control program.
Figure 17B:
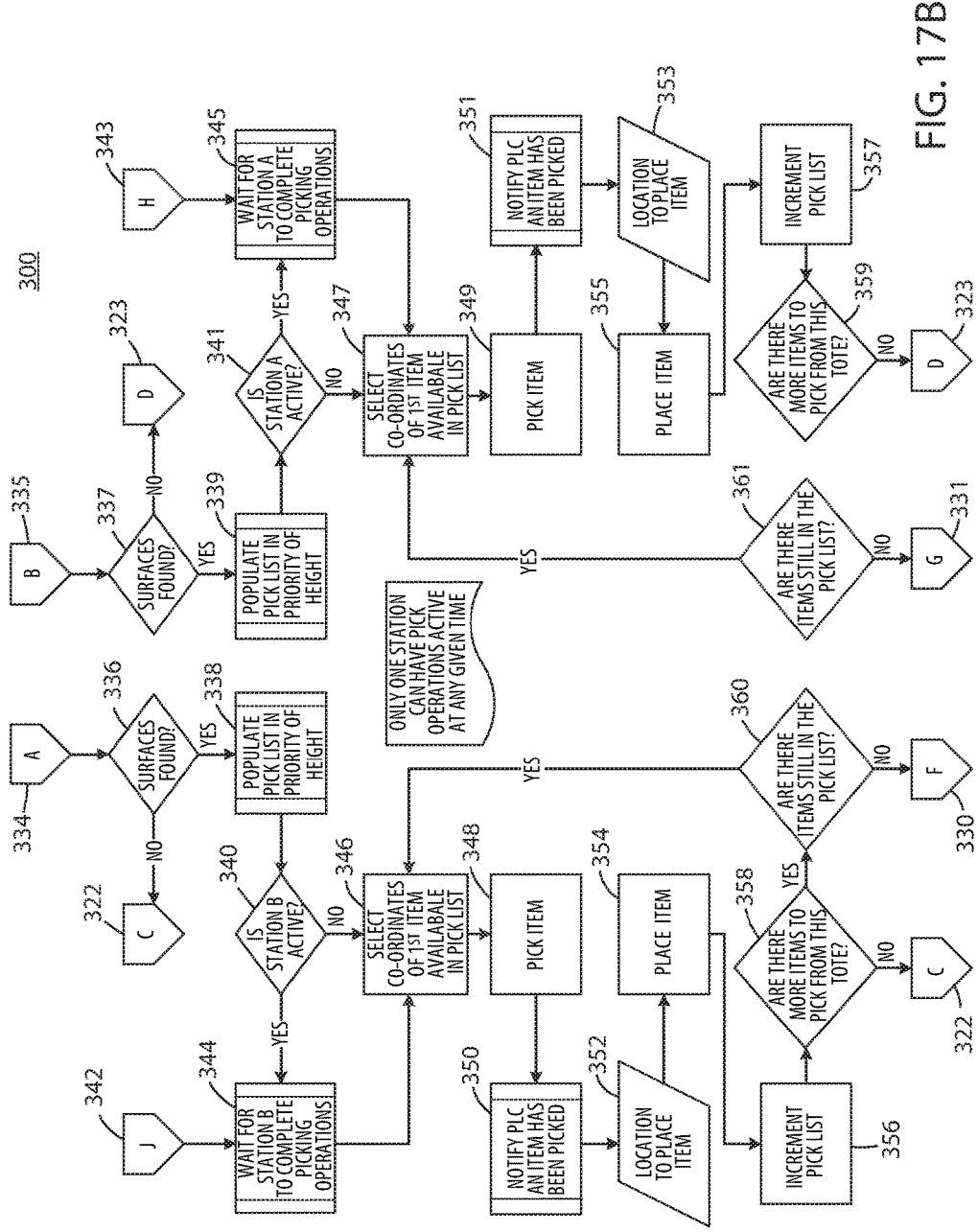
Figure 17C:
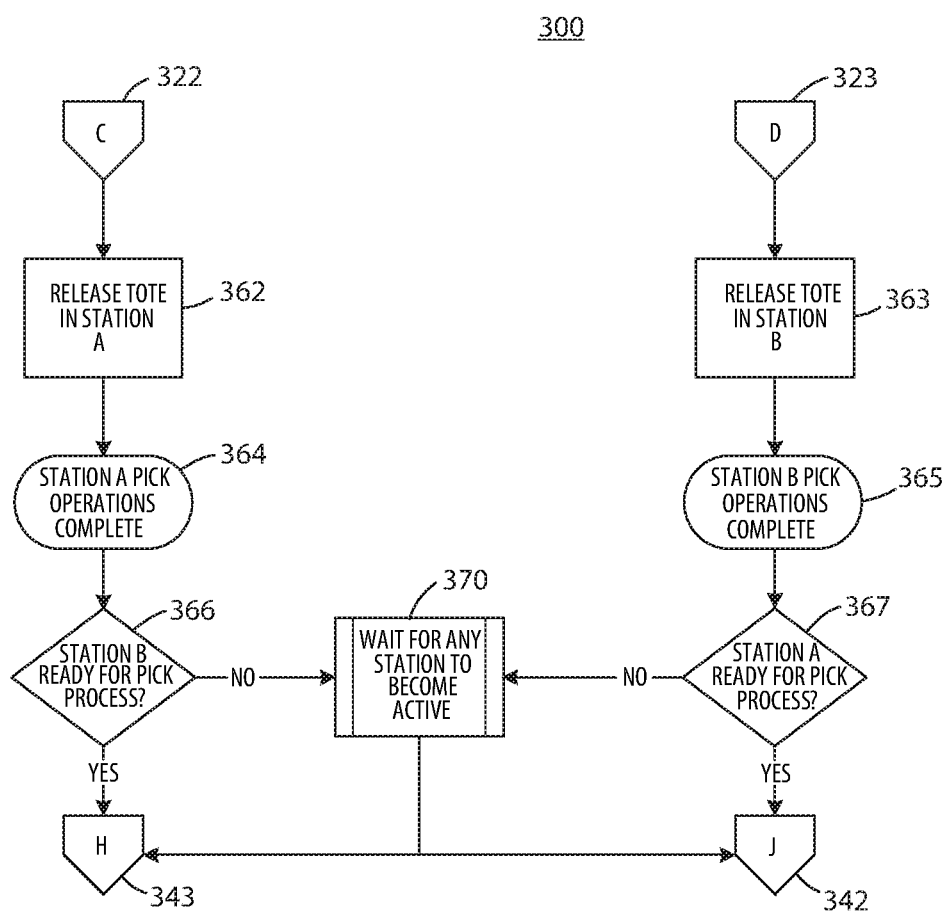

A control 15 controls operation of donor-handling system 12, recipient-handling system 14, vision system 18 and item manipulator 20 and various interconnecting conveying systems using a control program 300 (FIGS. 17a-17c). Program 300 begins at 302 by determining a sequence plan at 308 from customer orders 304 and inventory of available product to fill those orders at 306. Various techniques known in the art may be used to prioritize orders or delay orders if all inventory for an order is not available. With the order sequence planned at 308 the donor receptacles having items to fill the orders are retrieved from donor source 40 at 310 in a particular sequence. The donor receptacles are sent to donor-handling system 12 at 312 and sent to one of the donor buffers 23 or 25 at 314. The initial pass through the control program is arbitrary as to which buffer is selected. Essentially, the same sequence is followed which ever buffer is selected. The program in FIG. 17a is primarily needed at system startup and is not needed thereafter.

Assuming the buffer defined as station A is selected at 314, program 300 determines at 316 which items need to be picked from the receptacle and the donor receptacle arrives at the station A buffer at 318. If it is determined at 320 that at least one item is to be picked from that donor receptacle, program 300 determines at 324 whether vision system 18 is scanning a donor receptacle at the Station B buffer. If so, program 300 waits for the Station B buffer to complete at 326 so only one receptacle is scanned at a time. When the scanning of the receptacle at the Station B buffer is complete, a scan of the receptacle at the Station A buffer is commenced at 328 and proceeds at 332 until all pickable surfaces are scanned. It is then determined at 336 if any such surfaces are located and, if so, a pick list is populated at 338 starting from the items with the highest heights. With knowledge of the content that is supposed to be in the donor receptacle and package dimension of those items, the pick list is constructed from this information and the scanned data. It is then determined at 340 if Station B is actively picking items from its donor receptacle. If so, program 300 pauses at 344 for item manipulator 200 to complete picking items from the donor receptacle at the Station B buffer.

As indicated above, program 300 could alternatively begin by sending the first donor receptacle to the Station B buffer at 319 with an indication at 317 as to which items are to be picked from that receptacle to fill recipient receptacles. If it is determined at 321 that there is at least one item to be picked from that donor receptacle, the program waits to scan that receptacle at 327 until it is determined at 325 that the receptacle at the Station A buffer is fully scanned. The program then causes vision system 18 to scan the contents of the donor receptacle at the Station B buffer at 329 to locate pickable surfaces at 333 and populated a pick list at 339. When it is determined at 341 that item manipulator 20 is no longer active in picking items from the receptacle at Station A, then manipulator 20 begins picking items from the receptacle at the Station B buffer at 347.

Returning to Station A, when it is determined at 340 and 344 that item manipulator 20 is no longer picking items from the donor receptacle at Station B, then picking commences from the receptacle at the Station A buffer by selecting the coordinates of the first available item on the pick list at 346, picking that item at 348 and notifying an administrative program at 350 that the item has been picked from the donor receptacle. The administrative program then instructs program 300 which recipient receptacle on one of the recipient buffers 26 is to receive that item at 352 and the item is placed to that recipient receptacle at 354 by the item manipulator. The pick list is then incremented at 356 and a determination is made at 358 if there are still items remaining to be picked from the donor receptacle at Station A. If so, it is determined at 360 if there are still items to be picked from the pick list. If there are still items in the receptacle but the pick list is emptied, then the program returns to 328 for further scanning of the donor receptacle to prepare a new pick list. Any items still in the donor receptacle but not on a pick list would not have been scanned when the donor receptacle was originally scanned by vision system 18, such as because they were blocked from the 3D camera by items on top of the remaining item. Once those items on top are picked, the lower items remain to be scanned at 328 and placed on a new pick list at 332, 336 and 338. This process is repeated until the donor receptacle has been emptied at 358. From 358 the receptacle is released from Station A at 362 and the picking of that donor receptacle designated in the administrative software as complete at 364.

If it is determined that the donor receptacle at Station B has been scanned and ready to be picked at 366, then processing switches to Station B where picking commences at 347, 349, 351, 353, 355 and 357 once it is determined at 341 that item manipulator is no longer picking items at Station A. When it is determined at 359 that there are additional items in the donor receptacle at Station B that are not on the pick list at 361, additional scanning of the items in the donor receptacle commences at 329 and a new pick list generated at 333, 337 and 339. When it is determined at 359 that the donor receptacle at Station B is empty of items, the empty receptacle is released at 363 and designated complete at 365.

The picking function then returns to the donor receptacle at Station A when it is determined at 367 that the receptacle at Station A has been scanned for a pick list and is ready for picking. Thus, it can be seen that program 300 scans a donor receptacle at Station A to develop a pick list while item manipulator 20 picks items from a receptacle at Station B. During the picking of items from the receptacle at Station B, the content of the donor receptacle may be scanned to provide a new pick list if there are items remaining in the receptacle after the original pick list is full picked. Then picking commences from the donor receptacle at Station A which was originally scanned while the item manipulator picks items from the donor receptacle at Station B.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present Invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An automated order fulfillment system, comprising:
a donor-receptacle handling system having at least two donor buffers wherein said donor receptacle handling system comprises at least two donor conveying lines each having one of said at least two donor buffers;
a recipient-receptacle handling system having at least one recipient buffer;
an item-handling system comprising a vision system and an item manipulator;
said vision system having a field of view encompassing said at least two donor receptacle buffers;
a control causing said vision system to perform a process of scanning items in a donor receptacle at one of said at least two donor buffers to obtain a pick list of location data of items in the scanned donor receptacle that are to be picked based on the pick list;
said control causing said manipulator to perform another separate process of picking at least one item from another donor receptacle at the other of said at least two donor buffers under guidance of said vision system and place the picked item to a recipient receptacle at the at least one recipient buffer using the location data from the pick list of items in that donor receptacle; and
said control causing said vision system to perform the process of scanning items in the donor receptacle at said one of said at least two donor buffers overlapping in time with said control causing said manipulator perform the another separate process of picking at least one item from the another receptacle at the another of said at least two donor buffers under guidance of said vision system.

2. The automated order fulfillment system as claimed in claim 1 wherein the pick list includes the height of items that are visible to the vision system and the manipulator picks items from the pick list in sequence according to the height of the items.

3. The automated order fulfillment system as claimed in claim 1 wherein said vision system comprises at least one three-dimensional image capture device.

4. The automated order fulfillment system as claimed in claim 3 wherein said at least one three-dimensional image capture device comprises at least two three-dimensional image capture devices.

5. The automated order fulfillment system as claimed in claim 1 wherein said control causes said vision system to scan items of the another donor receptacle at the another of said at least two donor buffers from which the manipulator is picking items to provide a new pick list if there are items remaining in the donor receptacle after the original pick list is fully picked.

6. The automated order fulfillment system as claimed in claim 1 wherein said at least one recipient buffer is at a different elevation than said at least two donor buffers.

7. The automated order fulfillment system as claimed in claim 6 wherein said at least one recipient buffer is subjacent said at least two donor buffers.

8. The automated order fulfillment system as claimed in claim 6 wherein said at least two donor buffers are at different elevations from each other and said at least one recipient buffer is at an intermediate elevation between the elevations of said at least two donor buffers.

9. The automated order fulfillment system as claimed in claim 1 wherein said item manipulator comprises a robot arm with an end-of-arm item-grasping tool.

10. The automated order fulfillment system as claimed in claim 1 wherein said at least one recipient buffer comprises a plurality of generally parallel recipient buffers each connected with a non-completed recipient receptacle conveying line at one end thereof and a completed recipient receptacle conveying line at an opposite end thereof.

11. The automated order fulfillment system as claimed in claim 1 wherein said item manipulator is straddled by said at least two donor buffers.

12. The automated order fulfillment system as claimed in claim 1 wherein recipient-receptacle handling system comprises at least two recipient buffers and wherein said item manipulator is straddled by said at least two recipient buffers.

13. An automated order fulfillment system, comprising:
   a donor-receptacle handling system having at least two donor buffers, wherein said donor receptacle handling system comprises at least two donor conveying lines each having one of said at least two donor buffers;
   a recipient-receptacle handling system having at least one recipient buffer;
   an item-handling system comprising a vision system and an item manipulator;
   said vision system having a field of view encompassing said at least two donor receptacle buffers;
   a control causing said vision system to perform a process of scanning items in a donor receptacle at one of said at least two donor buffers to obtain a pick list of location data of items in the scanned donor receptacle that are to be picked based on the pick list;
   said control causing said manipulator to perform another process of picking at least one item from another donor receptacle at the other of said at least two donor buffers under guidance of said vision system and place the picked item to a recipient receptacle at the at least one recipient buffer using the location data on the pick list of items in that another donor receptacle;
   said control causing said vision system during said another process to scan items of the another donor receptacle at the other of said at least two donor buffers from which the manipulator is picking items to provide a new pick list of location data of items in the scanned donor receptacle that are to be picked based on the pick list if there are items remaining in the another donor receptacle after the original pick list is fully picked; and
   wherein said control causes said vision system to perform the process of scanning items in the donor receptacle at said one of said at least two donor buffers separate from said control causing said manipulator to perform the another process of picking said at least one item from the another donor receptacle at the other of said at least two donor buffers under guidance of said vision system.

14. The automated order fulfillment system as claimed in claim 13 wherein the pick list includes the height of items that are visible to the vision system and the control causes the manipulator to picks items from the pick list in sequence according to the height of the items.

15. The automated order fulfillment system as claimed in claim 13 wherein said vision system comprises at least one three-dimensional image capture device.

16. The automated order fulfillment system as claimed in claim 15 wherein said at least one three-dimensional image capture device comprises at least two three-dimensional image capture devices.

17. The automated order fulfillment system as claimed in claim 13 wherein said at least one recipient buffer is at a different elevation than said at least two donor buffers.

18. The automated order fulfillment system as claimed in claim 14 wherein said at least one recipient buffer is subjacent said at least two donor buffers.

19. The automated order fulfillment system as claimed in claim 14 wherein said at least two donor buffers are at different elevations from each other and said at least one recipient buffer is at an intermediate elevation between the elevations of said at least two donor buffers.

20. The automated order fulfillment system as claimed in claim 13 wherein said item manipulator comprises a robot arm with an end-of-arm item-grasping tool.

21. The automated order fulfillment system as claimed in claim 13 wherein said at least one recipient buffer comprises a plurality of generally parallel recipient buffers each connected with a non-completed recipient receptacle conveying line at one end thereof and a completed recipient receptacle conveying line at an opposite end thereof.

22. The automated order fulfillment system as claimed in claim 13 wherein said item manipulator is straddled by said at least two donor buffers.

23. The automated order fulfillment system as claimed in claim 13 wherein said recipient-receptacle handling system comprises at least two recipient buffers and wherein item manipulator is straddled by said at least two recipient buffers.

24. An automated method for fulfilling orders, comprising:
   a donor-receptacle handling system having at least two donor buffers wherein said donor receptacle handling system comprises at least two donor conveying lines each having one of said at least two donor buffers;
   a recipient-receptacle handling system having at least one recipient buffer;
   an item-handling system comprising a vision system and an item manipulator;
   said vision system having a field of view encompassing said at least two donor buffers;
   performing a process of scanning items in a donor receptacle at one of said at least two donor buffers with said vision system to obtain a pick list of location data of items in the scanned donor receptacle that are to be picked based on the pick list;
   performing another separate process of picking at least one item from a donor receptacle at the other of said at least two donor buffers with said manipulator under guidance of said vision system and placing the picked item to a recipient receptacle at the at least one recipient buffer of the recipient-handling system using the location data of items in the pick list of that donor receptacle; and
   process of scanning items with said vision system in a receptacle at one of said at least two donor buffers overlapping in time with said another separate process of picking items from another receptacle at another said of said at least two donor buffers under guidance of said vision system.

25. An automated method for fulfilling orders, comprising:
   a donor-receptacle handling system having at least two donor buffers wherein said donor receptacle handling system comprises at least two donor conveying lines each having one of said at least two donor buffers;
   a recipient-receptacle handling system having at least one recipient buffer;
   an item-handling system comprising a vision system and an item manipulator;
   said vision system having a field of view encompassing said at least two donor receptacle buffers;
   performing a process of scanning items in a donor receptacle at one of said at least two donor buffers with said vision system to obtain a pick list of location data of items in the scanned donor receptacle that are to be picked based on the pick list;
   performing another process of picking at least one item from a donor receptacle at the other of said at least two donor buffers with said manipulator under guidance of said vision system and placing the at least one picked item to a recipient receptacle at the at least one recipient buffer of the recipient-handling system using the location data of items from the pick list in that donor receptacle;

said another process including scanning items with said vision system of the another donor receptacle at the other of said at least two donor buffers from which the manipulator is picking items to provide a new pick list of location data of items in the scanned donor receptacle that are to be picked based on the pick list if there are items remaining in the donor receptacle after the original pick list is fully picked; and wherein said performing the process of scanning items in the donor receptacle at said one of said at least two donor buffers is carried out separately from said performing the another process of picking said at least one item from the other donor receptacle at the other of said at least two donor buffers.

* * * * *